United States Patent [19]

Berman et al.

[11] E Re. 30,356

[45] Reissued Aug. 5, 1980

[54] HAND DRILLING

[76] Inventors: Herbert Berman, 1018 Beacon St.; Harvey L. Pastan, c/o Herbert Berman, 1018 Beacon St., both of Brookline, Mass. 02146

[21] Appl. No.: 915,912

[22] Filed: Jun. 16, 1978

Related U.S. Patent Documents

Reissue of:

[64] Patent No.: 3,427,720
Issued: Feb. 18, 1969
Appl. No.: 318,864
Filed: Oct. 25, 1963

[51] Int. Cl.[2] ..... A61C 11/06

[52] U.S. Cl. ..... 433/131; 318/138; 318/341; 318/67; 433/133

[58] Field of Search ..... 32/26, 27; 318/341, 318/807, 800, 798, 329, 607, 67, 138, 148, 765

[56] References Cited

U.S. PATENT DOCUMENTS

| | | | |
|---|---|---|---|
| 814,380 | 3/1906 | Lamme | 363/174 |
| 1,725,849 | 8/1929 | Cope | 57/100 |
| 2,340,875 | 2/1964 | Gibbs | 318/841 |
| 2,548,955 | 4/1951 | Demuth | 315/325 |
| 2,570,651 | 10/1951 | Demuth | 318/807 |
| 2,585,573 | 2/1952 | Moore | 318/807 |
| 2,623,203 | 12/1952 | Demuth | 363/71 |
| 2,710,372 | 6/1955 | McCleery | 318/765 |
| 2,714,697 | 8/1955 | Small | 318/800 |
| 2,899,745 | 8/1959 | Flatland | 32/28 |
| 2,917,829 | 12/1959 | Page | 32/27 |
| 2,923,871 | 2/1960 | Cohen | 318/798 |
| 2,987,662 | 6/1961 | Jamieson | 318/329 |
| 3,034,028 | 5/1962 | Jamieson | 318/607 |
| 3,178,624 | 4/1965 | Borden | 318/67 |

FOREIGN PATENT DOCUMENTS

| | | | |
|---|---|---|---|
| 1295382 | 5/1962 | France | 32/27 |
| 917975 | 2/1963 | United Kingdom | 32/27 |

*Primary Examiner*—Robert Peshock
*Attorney, Agent, or Firm*—Charles Hieken

[57] ABSTRACT

*A hand drill includes an induction motor energized by a multi-phase electrical power source with the angle between consecutive phase maintained substantially constant over a wide frequency range by energizing logical circuitry comprising a number of flip-flops intercoupled by AND GATES.*

11 Claims, 8 Drawing Figures

FIG. 1
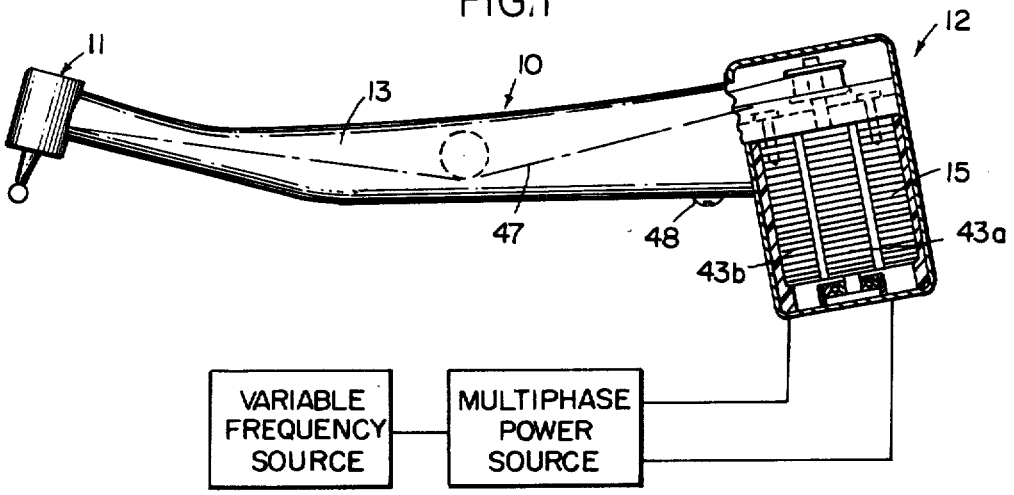
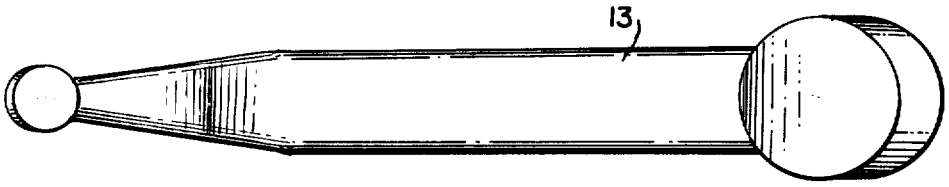
FIG. 2
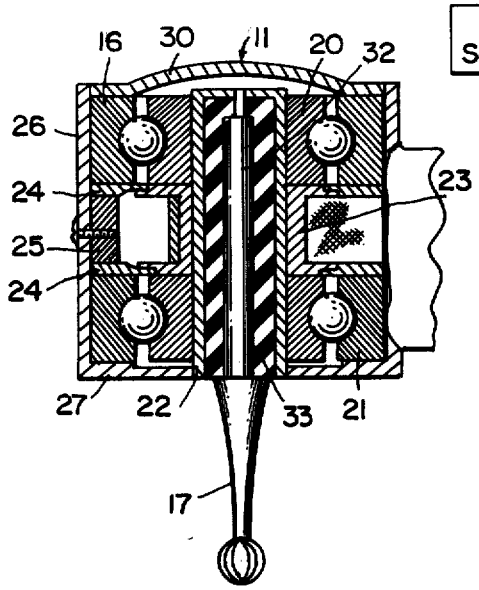
FIG. 3
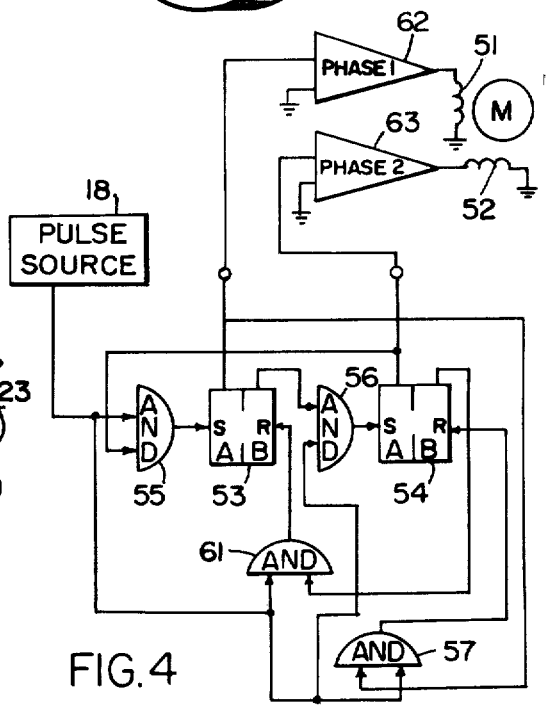
FIG. 4

FIG. 5
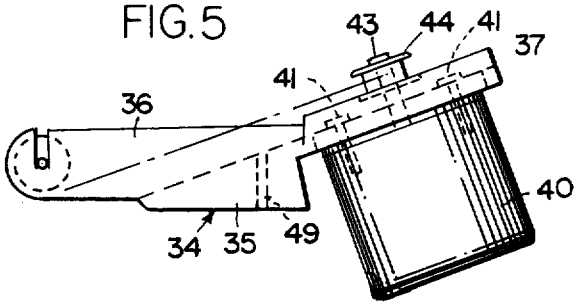
FIG. 6
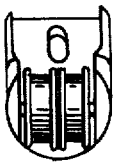
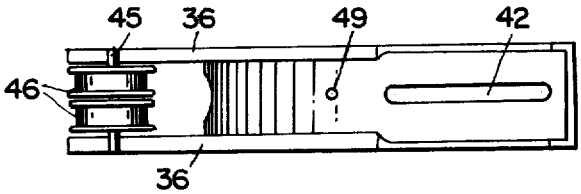
FIG. 7
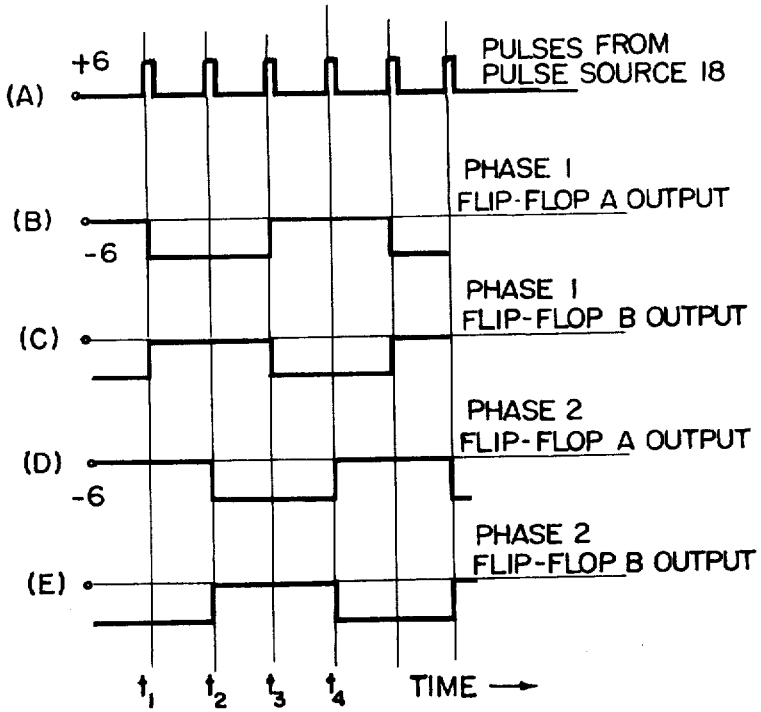
FIG. 8

HAND DRILLING

Matter enclosed in heavy brackets [ ] appears in the original patent but forms no part of this reissue specification; matter printed in italics indicates the additions made by reissue.

BACKGROUND OF THE INVENTION

This invention relates to a hand drilling apparatus and more particularly comprises a new and improved dental drill which operates in the intermediate to high rotating speed range.

The development of carbide and diamond drill bits and adequate cooling systems for them has been accompanied by the development of high speed dental drills, as typified in Page U.S. Pat. No. 2,824,370, dated Feb. 25, 1958, and Hoffmeister et al. U.S. Pat. No. 3,092,908, dated June 11, 1963. These patents illustrate the two major approaches taken in the development of high speed drills. In the Page device the handpiece is connected to and driven by a conventional engine arm, and the high speed is attained through the step up of pulley sizes in the handpiece. The high speed drill of Hoffmeister et al. employs an air turbine directly connected to the drill chuck and driven by compressed air directed from a source through a duct in the handpiece.

The air turbine type handpiece although light and maneverable because it is only connected by one or a few very flexible hoses to the compressed air source and perhaps a water supply for cooling, nevertheless is useful only in the highest speed ranges where the tactile control is extremely light. Small increases of pressure stall this instrument unpredictably, and if the instrument is operated at lower speeds at reduced air pressures, the instrument stalls even more easily. On the other hand, the more conventional types of dental engines and engine arm drives have enough power and torque to maintain tooth grinding and cutting operations at more moderate speeds where tactile pressures are proportionately greater. However, these handpieces are relatively heavy and awkward because of the connections to the engine arm. Further, the weight, vibration and inertia of parts attached to such handpieces during brush-like strokes against the teeth reduce the operator's sensitivity.

Most dentists prefer one or the other type of dental drill and have equipped their offices accordingly, but many dentists have both so as to be able to use instruments best suited to perform the particular operation at hand. This solution has many obvious disadvantages, not the least of which is the double expenditure involved.

It is a general object of this invention to provide an improved dental drilling instrument capable of operating at a speed and power which may be selectively varied by the operator in a closely controlled manner.

Another general object of this invention is to provide a lighter, more flexible and more maneuverable dental drill than those now available having a high degree of controllability and sufficient power.

Yet another object of this invention is to provide a dental drill which affords the operator optimum control throughout the intermediate to high rotating speed range so as to increase the number of easily performable operations by use of a single piece of equipment.

Still another important object of this invention is to provide a mobile and easily transportable dental drill which does not require a conventional dental console or large compressor but only a standard A-C outlet.

A further object of this invention is to provide electric high speed dental and surgical drills which may be used safely in the presence of explosive and combustible mixtures of gases that are present when certain general anesthetics are used.

*SUMMARY OF THE INVENTION*

To accomplish these and other objects this invention includes among its features a lightweight handpiece which may be held comfortably in one hand and which is a self-contained unit except for an electric cord which may be connected to any convenient A-C outlet. The handpiece may also be connected by means of an extremely flexible hose to a compressed air source and/or a water supply for cooling. The handpiece itself contains a chuck for carrying the drill bit or bur and a motor which is operatively connected to the chuck for driving it. The motor is free of brushes or other types of mechanical connectors between its rotor and armature which may spark when the motor rotates. Rather, the rotor and armature are inductively coupled together. The motor is provided with multiphase power over a wide range of frequencies, and the rotational speed of the motor is a function of the frequency.

These and other objects and features of this invention along with its incident advantages will be better understood and appreciated from the following detailed description of one embodiment thereof, selected for purposes of illustration and shown in the accompanying drawing, in which:

*BRIEF DESCRIPTION OF THE DRAWING*

FIG. 1 is a side view partly in section of a handpiece constructed in accordance with this invention;

FIG. 2 is a top view of a handpiece shown in FIG. 1;

FIG. 3 is an enlarged cross-sectional view of the head of the handpiece shown in FIG. 1;

FIG. 4 is a block-schematic diagram of the control system for the handpiece motor;

FIG. 5 is an enlarged detail view of the motor mounting of the handpiece;

FIG. 6 is an end view of the mounting shown in FIG. 5;

FIG. 7 is a top view of the mounting shown in FIG. 5 with certain parts removed; and, FIG. 8 is a graphical representation of signal wave forms plotted to a common time scale helpful in understanding the mode of operation of the system of FIG. 4.

*DETAILED DESCRIPTION OF PREFERRED EMBODIMENTS*

The handpiece of this invention shown in the drawing includes a contra-angle handle 10, a head 11 mounted on one end of the handle and a motor assembly 12 mounted on the other end of the handle. In FIG. 1 the motor is shown connected to a multiphase power source and a variable frequency multi-phase source. The handle 10 is comprised of a hollow sleeve 13 through which extends the mechanical connections between the motor 15 of the assembly 12 and the drill chuck 16 mounted in the head 11.

The details of the chuck 16 for supporting the bur 17 form no part of this invention and are described only briefly, as many different types of chucks may be employed. The chuck shown in FIG. 3 includes a pair of ball bearings 20 and 21 that support a drill socket 22, and the ball bearings are separated in part by a pulley 23 rigidly connected to the socket. A pair of washers 24 are separated by a spacer 25 in turn secured to the housing 26 of the head, and the housing may form an integral part of the handle sleeve 13. Alternatively, shielded bearings separated by a spacer between the outer races could be used. End plates 27 and 30 close the housing 26 and secure the socket 22 against axial displacement. The spacer 25 which separates the bearings extends about a substantial portion of the circumference of the chuck assembly but provides a space at the handle side of the housing 26 to allow a belt to extend into the housing and about the pulley 23. The shank 32 of the bur 17 fits tightly within the sleeve 33, made of rubber, plastic or similar material, disposed in the socket 22, so that a frictional connection is made between the bur 17 and the pulley 23.

The details of the motor assembly 12 are shown in FIGS. 5–7. The assembly includes a mounting block 34 having a base 35 and a pair of parallel side plates 36. The side plates 36 along with the left end of the base 35 of the block slide into the sleeve 13 of the handle 10. The thinner portion 37 of the block 35 carries the motor housing 40 which is secured thereto by a pair of mounting screws 41 that pass through an elongated slot 42 in the portion 37. The slot extends in a direction generally parallel to the handle. The motor shaft 43 of the motor 15 within the housing 40 also extends through the slot 42. The elongated slot 42 allows the motor and housing to be moved toward and away from the handle 10 to adjust the tension on the pulley belt described in greater detail below. The motor shaft 43 supports the drive pulley 44 above the portion 37 of the block as viewed in FIG. 5.

A shaft 45 extends between the ends of the arms 36 and carries a pair of idler pulleys 46 which lie within the sleeve 13 adjacent the angle in the handle. A belt 47 which mechanically connects the motor 43 and the chuck 16 extends about the drive pulley 44 and one belt course extends beneath one of the idler pulleys 46 to the pulley 23 connected to the drill socket 22, and the return course of the belt extends from the pulley 23 beneath the other idler pulley 46 back to the drive pulley 44. The idler pulleys 46 on the shaft 45 between the ends of the arms 36 enable the belt to extend from the drive pulley 44 to the chuck pulley 23 without interference from the bend in the handle.

A screw 48 is disposed in an opening in the sleeve 13 and screws into a tapped hole 49 in the base 35 of the block 34 to anchor the motor assembly 12 to the handle. When the parts are assembled, the tension on the belt 47 may be adjusted by loosening the screws 41 and sliding the motor toward or away from the handle sleeve 13 made possible by the slot 42. When the proper tension is achieved the mounting screws need only be tightened to lock the motor housing and the shaft 43 and drive pulley 44 a fixed distance from the idler pulleys 46 and the chuck pulley 23.

The motor 15 as suggested in the introduction is brushless, and the rotor 43a and stator 43b are inductively coupled so that no arcing occurs during rotor rotation. The rotor 43a may be of a squirrel cage design as shown, as is conventional in an induction motor, or may be a permanent magnet of the hysteresis type. The speed of rotation of the rotor is a function of the frequency of excitation.

The motor must have a maximum power-weight ratio for this particular application, and the induction and hysteresis motors have this quality. A minimum of power is required at each speed to overcome bearing friction, and the power available is sufficient to avoid stalling even, with substantial tactile pressures used in cutting and grinding. One motor which has proved satisfactory is manufactured by Globe Industries, Inc., Dayton, Ohio, and is identified as size 11 rated at 27 volts, 2 phase, 400 c.p.s., 15,000 r.p.m. minimum, part No. C-53A-112-1.

Referring to FIG. 4, there is shown a combined block-schematic diagram illustrating the logical arrangement of a system for providing multiple phase power to the brushless motor over a wide range of frequencies. The specific example in FIG. 4 provides a pair of signals separated in time phase by substantially a quarter period at the fundamental frequency of the energy applied to the first and second motor windings normally arranged in space quadrature. Variable frequency source 18 provides a train of pulses shown in FIG. 8 that are processed to provide signal waveforms substantially in time quadrature for application to the stator windings 51 and 52 respectively of motor 15. Operation of the specific means for providing the multiple phase motor driving energy of variable frequency will be better understood by referring to FIG. 8 illustrating a number of pertinent waveforms plotted to a common time scale.

The logical circuitry includes a phase 1 flip-flop 53 and a phase 2 flip-flop 54, each triggered at appropriate times by a pulse from pulse source 18 passed through an appropriate one of the AND gates when enabled by an appropriate conditioning potential from the appropriate output of the other flip-flop. Each flip-flop includes set and reset inputs, designated S and R respectively, and A and B outputs.

At time $t_1$ the set input of phase 1 flip-flop 53 receives a trigger pulse from pulse source 18 to set flip-flop 53 when the A output of phase 2 flip-flop 54 at zero or ground potential enables gate 55, this A output waveform being shown in FIG. 8D. If flip-flop 53 had been in the set condition, the trigger pulse passed by AND gate 55 would keep the flip-flop in the set state. With the phase 1 flip-flop 53 in the reset condition, the pulse transmitted by enabled AND gate 55 sets this flip-flop to the set condition with its A output at −6 volts as shown in FIG. 8B and its B output at substantially ground potential as shown in FIG. 8C. This shift in A and B output potentials respectively enables AND gate 56 to transmit the next pulse from source 18 at time $t_2$ to the set input S of phase 2 flip-flop 54 and disables AND gate 57 connected to the reset input of the phase 2 flip-flop 54.

The pulse from source 18 is transmitted by AND gate 56 at time $t_2$ then sets flip-flop 54 to establish its A output substantially at −6 volts to disable AND gate 55 and establish its B output substantially at ground potential to enable AND gate 61 to transmit the next pulse from source 18 to the reset input of phase 1 flip-flop 53.

Gate 61 then transmits the next pulse from source 18 at time $t_3$ to the rest input of phase 1 flip-flop 53 to reset that flip-flop so that its A output is substantially at ground potential, enabling gate 57, and its B output is substantially at −6 volts, disabling gate 56.

At time $t_4$ enabled AND gate 57 then transmits the next pulse from pulse source 18 to the rest input R of phase 2 flip-flop 54 to return that flip-flop to the rest condition with its A output at substantially ground potential, enabling gate 55, and its B output at substantially −6 volts, disabling gate 61. The apparatus is thereby ready to commence another cycle of the type described above.

Observe that the waveforms shown in FIGS. 8B and 8C available from the A and B outputs, respectively, of phase 1 flip-flop 53 are a quarter period out of phase with the waveforms of FIGS. 8D and 8E available from the A and B outputs of phase 2 flip-flop 54. The phase 1 power amplifier 62 amplifies the signal available at the A output of phase 1 flip-flop 53 and delivers the amplified signal at higher power level to phase 1 winding 51 of motor 15. The phase 2 amplifier 63 amplifies the signal available at the A output of phase 2 flip-flop 54 to provide that signal at higher power level to the phase 2 winding 52 of motor 15.

By varying the pulse repetition rate of pulse source 18, the speed of motor 15 may be varied while its space quadrature windings, energized substantially in time quadrature, continue to develop the rotating field that keeps the rotor of the motor turning with relatively high torque. If power amplifiers 62 and 63 are low impedance output amplifiers, it is advantageous to include a pair of attenuators at the inputs to power amplifiers 62 and 63, preferably ganged with the pulse repetition rate control of pulse source 18 so that an increase in frequency is accompanied by an increase in voltage to keep the current in windings 51 and 52 as high as practical to maximize torque. Alternately, power amplifiers 62 and 63 may comprise high impedance output electron tubes or transistors which function essentially as constant current sources to provide windings 51 and 52 with substantially constant current independent of frequency.

While an exemplary embodiment of the invention provides two-phase variable frequency power, the principles disclosed herein are applicable to providing variable frequency power having three or more phases. In general there is a flip-flop for each phase, and pulse source 18 provides two pulses for each phase so that a period of n phases corresponds substantially to the interval separating $2n+1$ consecutive pulses. The separation between the initiation of successive phases is this period divided by 2n.

The circuit described above will divide the bur at approximately 200,000 r.p.m., and substantial loads on the drill will not unduly reduce the operating speed. The advantages of such a tool will be apparent in the light of the remarks in the introduction. High speed drilling is achieved, without the stalling difficulties normally encountered in the turbine-type drills. The handpiece is as light and maneuverable as the turbine-type instruments and can be operated wherever an A-C electric outlet is available. Thus, the device has all of the advantages without the accompanying disadvantages of the two major forms of drills now used.

From the foregoing description those skilled in the art will appreciate that modifications may be made in the illustrated embodiment without departing from the spirit and scope of this invention. Moreover, it will be recognized that this invention has application beyond the dental art. Therefore, it is not intended that the invention be limited to the specific embodiment illustrated and described. Rather, its scope should be determined by the appended claims and their equivalent.

What is claimed is:

1. Hand drilling apparatus comprising:

means defining a casing that can be held in one hand, means secured to said casing for supporting a bit for high speed rotary motion, an electric brushless motor having a rotor inductively coupled to a stator and supported by said casing for imparting rotary motion through means including the bit supporting means to a bit when supported by the latter, a source of multi-phase electrical power of controllable frequency, leads coupling said electrical power source to said electrical brushless motor, and means for adjusting the frequency of said electrical power to control the speed of said rotary motion to a maximum in the range of 200,000 r.p.m.,

*said source of multi-phase electrical power of controllable frequency comprising,*

*a pulse source of variable frequency,*

*at least first and second flip-flops having set and reset inputs and set and reset outputs,*

*and means including a plurality of AND gates for intercoupling said pulse source and said flip-flops for providing from like outputs of said first and second flip-flops signal waveforms of frequency determined by said pulse source with phase displaced from each other by a fraction of the period at said frequency independent of said frequency over a wide frequency range,*

*and first and second power amplifiers with respective inputs coupled to respective like outputs of said first and second flip-flops and respective outputs coupled to respective windings of said brushless motor for establishing a rotating field in said motor causing said rotor to rotate at a frequency related to that of said pulse source,*

*and said means for adjusting comprises means for adjusting the frequency of said pulse source.*

2. Hand drilling apparatus in accordance with claim 1 wherein said frequency is in the audio frequency range.

3. Hand drilling apparatus in accordance with claim 2 and further comprising:

means for also adjusting the magnitude of said electrical power.

4. Hand drilling apparatus in accordance with claim 2 and further comprising:

a single control for simultaneously adjusting both said electrical power frequency and magnitude.

5. Hand drilling apparatus in accordance with claim 1 wherein:

said casing defines a contra-angle, said means for supporting the bit being secured to one end of the casing and the motor being secured to the other end of said casing, drive and driven pulleys secured to the motor and means for supporting the bit, respectively, idler pulleys mounted in the casing adjacent the angle in the casing, and a belt connected between the drive and driven pulleys and guided by the idler pulleys.

6. Hand drilling apparatus in accordance with claim 1 wherein:

the means for adjusting the frequency of said electrical power provides continuous frequency adjustment in the audio frequency range.

7. A method of high speed drilling with controlled speed which method includes the steps of:

applying multiphase electrical power of continuously controllable frequency to an electrical brushless motor with a stator inductively coupled to a rotor that rotates the drilling bit, and adjusting said continuously controllable frequency to control the speed of rotation while maintaining the phase angle between the phases of the electric power substantially the same,

*the step of applying multiphase electrical power of continuously controllable frequency including applying pulses from a pulse source of controllable frequency to at least first and second flip-flops having set and reset inputs and set and reset outputs through gating means,*

*and applying output potentials from each of said set and reset outputs to respective ones of said gating means to sequentially enable respective ones of said gating means to transmit pulses from said pulse source to respective ones of said set and reset inputs to produce on like outputs of said first and second flip-flops waveforms of a frequency determined by said pulse source displaced in phase by a fraction of the period at the frequency of said waveforms independent of said frequency over a wide frequency range,*

*and power amplifying respective output waveforms from said first and second flip-flops to respective stator windings of said electrical brushless motor to establish a rotating electrical field that causes said rotor to rotate at a frequency determined by that of said pulse source.*

8. A method of high speed drilling in accordance with claim 7 and further including the step of also adjusting the magnitude of said electrical power to control said speed of rotation.

9. A method of high speed drilling in accordance with claim 8 wherein said controllable frequency and said magnitude are adjusted simultaneously.

*10. Hand drilling apparatus in accordance with claim 1 wherein said logical circuitry includes a first AND gate for enabling the transmission therethrough of a pulse from said pulse source to the set input of said first flip-flop when said second flip-flop is in a first of its two stable states,*

*a second AND gate for enabling the transmission of a pulse from said pulse source to the set input of said second flip-flop when said first flip-flop is in a second of its two stable states,*

*third gating means for transmitting a pulse from said pulse source to the reset input of said first flip-flop when said second flip-flop is in a second of its two stable states,*

*and fourth gating means for transmitting a pulse from said pulse source to the reset input of said second flip-flop when said first flip-flop is in a first of its two stable states.*

*11. A method of high speed drilling with controlled speed in accordance with claim 7 and further including the steps of enabling a first of said gating means to transmit pulses from said pulse source to the set input of said first flip-flop when said second flip-flop is in a first of its two stable states;*

*enabling a second of said gating means to transmit pulses from said pulse source to the set input of said second flip-flop when said first flip-flop is in a second of its two stable states,*

*enabling a third of said gating means to transmit pulses from said pulse source to the reset input of said first flip-flop when said second flip-flop is in a second of its two stable states,*

*and enabling a fourth of said gating means to transmit pulses from said pulse source to the reset input of said second flip-flop when said first flip-flop is in a first of its two stable states.*

* * * * *